March 29, 1932. C. L. JOHNSON 1,851,313
SPARE TIRE LOCK
Filed May 2, 1927 2 Sheets-Sheet 1
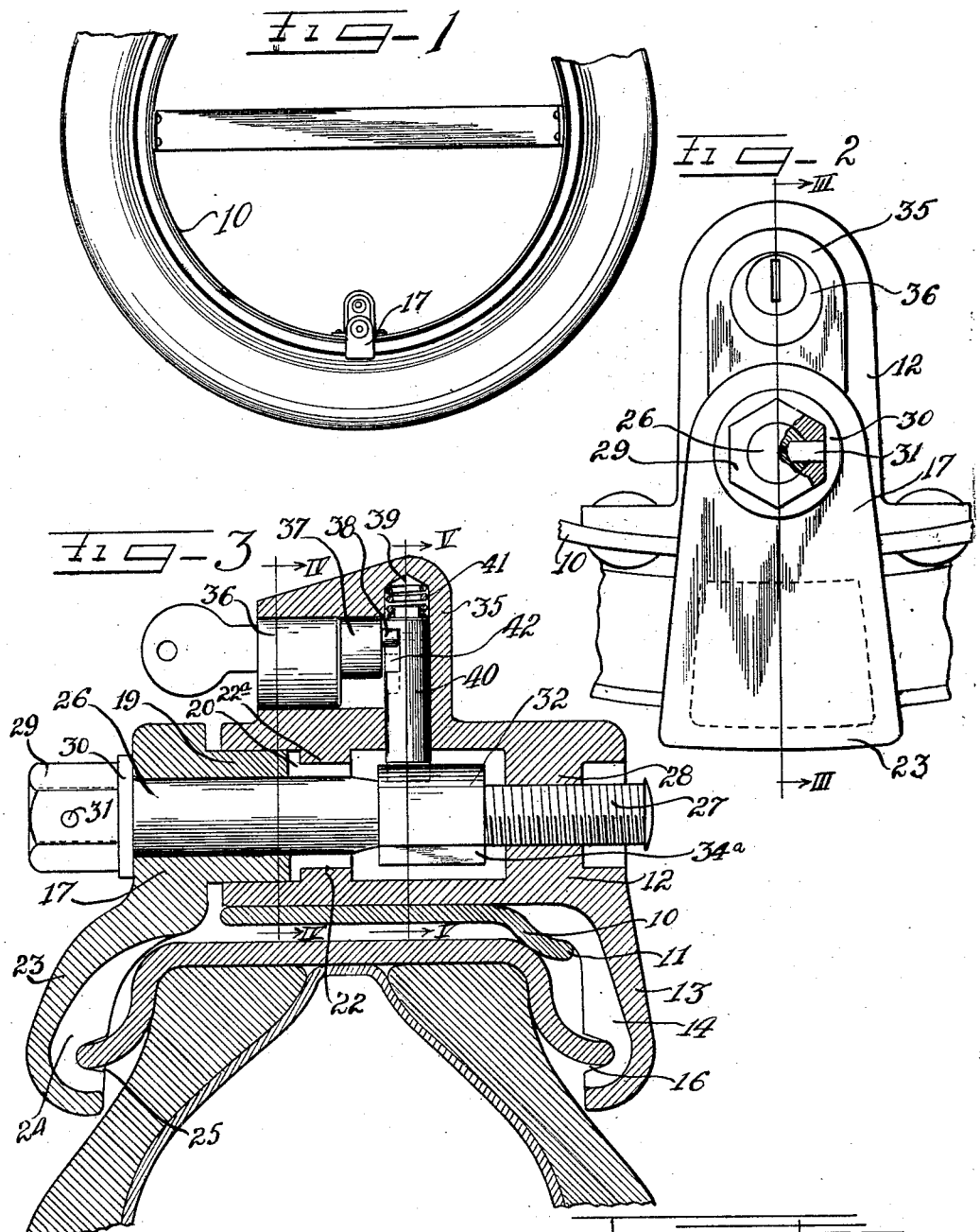
INVENTOR
Colvin L Johnson
By Charles Hill Attys

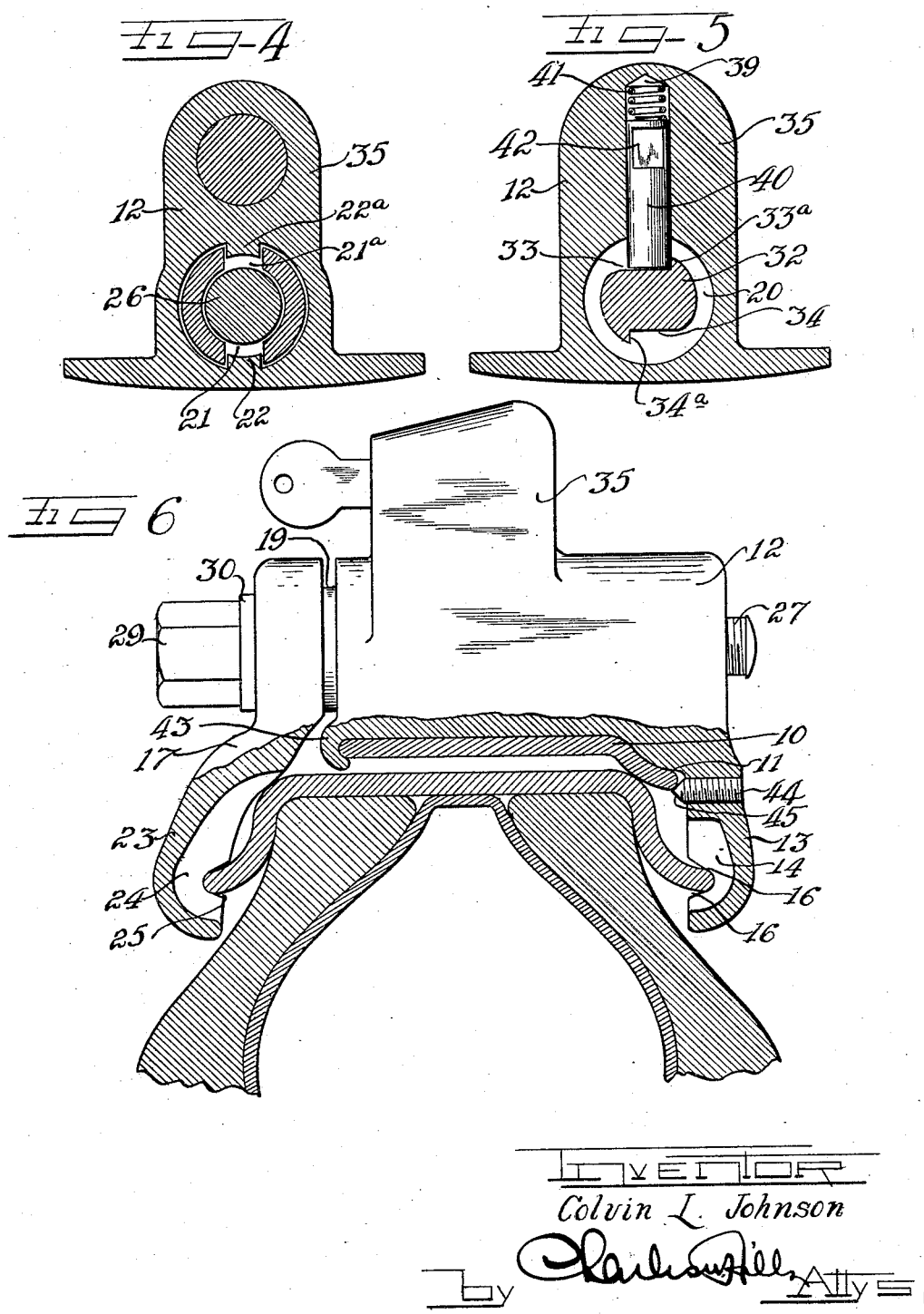

Patented Mar. 29, 1932

1,851,313

UNITED STATES PATENT OFFICE

COLVIN L. JOHNSON, OF ST. LOUIS, MISSOURI, ASSIGNOR, BY MESNE ASSIGNMENTS, TO DURO METAL PRODUCTS COMPANY, OF CHICAGO, ILLINOIS, A CORPORATION OF ILLINOIS

SPARE TIRE LOCK

Application filed May 2, 1927. Serial No. 188,132.

This invention relates to an improved tire lock and more particularly to a lock adapted to secure the spare tire and rim to the rack or rim portion of a spare tire carrier on an automobile body or chassis. Heretofore, difficulty has been experienced in the provision of a spare tire lock which is adapted to secure the rim portion of the standard tire carrier or rack, and which will quickly and without difficulty lock the tire and rim into rigid position on the tire carrier rack.

Therefore, it is an important object of this invention to provide a spare tire lock which can be permanently secured to the rim portion of the usual tire carrier, and which will quickly and without the use of a key, clamp and lock the spare tire and rim rigidly to the tire carrier.

It is a further important object of this invention to provide a spare tire lock of the class described which is quickly and conveniently adjustable to lock various sizes of tires and rims, and which holds the tire and rim in rigid position on the tire rack, thereby obviating any rattle during movement of the vehicle.

A further important object of this invention is the provision of a lock which can be quickly, easily and permanently secured to the tire rack by means of a single screw or bolt, thereby obviating the necessity of riveting, which is particularly difficult when the tire carrier is mounted on the back of the vehicle body.

It is a further important object of this invention to provide a lock into which the spare tire and tire rim may be securely locked by the mere rotation of screw means, and which can be unlocked to release the tire and rim by operation of key controlled means.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevational view of a tire mounted on the usual rim, and having secured thereon the improved locking device of this invention.

Figure 2 is an enlarged front view of my lock and showing one method of attaching it to the tire carrier.

Figure 3 is a cross section taken through the device on the line III—III of Figure 2.

Figure 4 is a cross section taken on the line IV—IV of Figure 3.

Figure 5 is a cross section taken on the line V—V of Figure 3.

Figure 6 is a fragmentary elevational view with parts in section, showing a modified form for securing my device.

As shown on the drawings:

The reference numeral 10 indicates the circular metal rim of the usual type of tire carrier which is securely mounted on the vehicle body or chassis. The rim 10 has its inward edge cast or rolled to form an annular flanged edge 11, which acts as a stop when the tire and tire rim is mounted thereon. The opposite edge of the rim 10 is upturned at the top of the carrier to form a flange (not shown), and as is well known, the spare tire rim, at the top of the carrier, is prevented from forward or rearward movement by these flanged edges, and in order to remove the spare tire and rim, it is necessary to pull the lower portion of the tire and rim rearwardly and then lift the same from its resting position at the top of the tire rack. The reference numeral 12 indicates a casing or housing adapted to rest on the inner surface of the carrier rim 10, and preferably at the lowermost part of said carrier rim 10. The casing 12 has a downwardly extending arm or jaw member 13 integral therewith, said arm member being curved at its periphery to form a hollow portion 14, and having recesses 16 formed therein to fit over the flange of a spare tire rim. A bushing member 17 has a relatively long annular flange 19 adapted to fit in and slide within the hollow passage 20 in the open end of the casing 12. As shown in Figure 4, upper and lower recesses 21 and 21a are formed in the periphery of the flange 19 and are adapted to engage over the short upper and lower integral keys 22 and 22a, thereby locking the bushing member 17 against rotation when it is in its innermost or locking position. The apertured clamping member 17 has a downwardly extending member 23 integral therewith, said member 23 having its edges turned inwardly to form a hollow portion 24. Recesses 25 are formed in the curved periphery on each side of said member 23 for reception of the flange of the spare tire rim.

A threaded bolt 26 passes through the aperture of the bushing member 17 and through the passage 20 of the casing 12, and its threaded end 27 threadingly engages a reduced portion 28 of the housing 12. A blank head or nut 29 having an annular flange 30 integral therewith is mounted on the forward end of said bolt and is secured thereon by a short pin 31 which passes laterally through said head and sets in an aperture in the bolt 26. The head 29 provides a means for turning the bolt 26 to permit movement of the clamping member 17 inwardly and outwardly relative to the casing 12. The threaded end 27 of the bolt 26 is preferably riveted to prevent entire removal of said bolt from the housing 12. The bolt 26 has an enlarged portion or collar 32 which is provided with two flat surfaces 33 and 34 diametrically opposite each other, each of said flat surfaces 33 and 34 having oppositely directed shoulders 33a and 34a for a purpose which will later appear. An auxiliary casing or housing 35 is formed above and integral with the main casing 12 to house the lock cylinder 36, said lock cylinder 36 being rotated by insertion of a suitable key. The lock cylinder 36 has at its inner end an eccentric plug 37, said plug 37 being in turn provided with an eccentric projection 38.

A vertical recess 39 in the auxiliary housing 35 and connecting with the inside of the housing 12, has slidably mounted therein a bolt 40 which is normally pressed downwardly by a helical spring 41 in the recess 39. The vertical recess 39 may be formed by drilling from the top of the auxiliary housing 35 and then welding to close the aperture in the top of said auxiliary housing. The eccentric projection 38 on the plug 37 projects into a recess 42 formed in the upper end of the slidable bolt 40. When the lock cylinder is rotated to locking position, the eccentric projection 38 will be moved into its lowermost position, and the bolt 40 will be moved downwardly by the action of the spring 41, and the end of the bolt 40 will be in engagement with the collar 32, thereby locking the bolt 26 against rotation. When the bolt 26 is rotated so that either of the flat portions 33 and 34 are on top, the lower end of the bolt 40 will engage with the said flat portions and the shoulders 33a and 34a, thereby locking the bolt 26 against counter-clockwise rotation. It will be noted, however, that the two diametrically opposite edges (one on each groove) are beveled, so that when the bolt 26 is rotated in clockwise direction, the bolt 40 will be moved upwardly against the action of the spring 41, thereby permitting clockwise rotation of the bolt 26 when it is desired to clamp the spare tire and rim in my device. The engagement of the shoulders 33a and 34a will prevent counterclockwise rotation of the bolt 26. It will also be noted that the recess 42 in the bolt 40 is a long groove or recess, this being for the purpose of permitting free upward movement of the bolt 40 irrespective of the position of the eccentric projection 38 on the plug of the lock cylinder 36. The advantage of the above-mentioned construction will be apparent in that it will permit clockwise rotation of the bolt 26 and resultant drawing together of the clamping member 17 and member 13, without the necessity of insertion of the key and rotation of the lock cylinder. The clamping member 17 cannot be released by counter-clockwise rotation of the bolt 26 due to the engagement of the shoulders 33a and 34a with the bolt 40.

A pin 31 is preferably used to secure the flanged nut 29 to the bolt 26 for the reason that a forced rotation of said bolt 26, when the device is locked, would shear the pin 31, thereafter leaving the device still locked against the attempts of a thief.

Figure 6 shows a slightly modified form of my device which provides a quick and easy method of securing the device to a spare tire carrier when the device is intended for accessory rather than standard equipment use. The base of the casing 12 is formed with a hooked flange 43 which is adapted to hook over the edge of the rim 11 of the spare tire carrier. A hole is drilled and threaded in the clamping member 13 of the casing 12 at a point substantially opposite the edge of the curved annular flange 11 of the tire carrier rim 10. A short screw 44 having a cone shaped end 45 is screwed in said threaded aperture so that the upper portion of the cone shaped end 45 of the screw 44 engages the edge of the curved annular flange 11 of the rim 10, the apex of said end 45 being below the edge of said flange 11 and securing the locking device rigidly to the tire carrier rim. The head of the screw 44 is preferably cut or ground off flush with the outer surface of the clamping member 13 to prevent unauthorized removal of the device from the rim of the tire carrier.

The operation is as follows:

To lock a spare tire and rim with my device, it is first necessary to turn the nut 29, and thereby put the bolt 26 in its outermost position, thereby permitting the clamping member to be moved outwardly to cause disengagement of the keys 22 and 22a, and permitting rotation of the clamping member 17 so that the member 23 will point upwardly. The rim and tire thereon is then set between the usual hooks or flanges at the top of the tire rack and the lower part of the tire and rim is pressed into its usual mounted position around the rim 10 of the carrier far enough so that the flange of the spare tire rim would engage in the hollow portion 14 and recesses 16 of the clamping member 13 of the casing 10. The clamping member 17 is then rotated to point downwardly, and the bolt 26 is rotated in clockwise direction to draw the clamping member 17 toward the clamping member 13, thereby securely clamping the tire rim and tire thereon on the spare tire rack.

To release the tire rim and tire, it is necessary to insert the key and rotate the lock cylinder until the eccentric projection 38 raises the bolt 40 to its upward position and then the bolt 26 is rotated and the clamping member pulled outwardly and turned upwardly to permit removal of the spare tire and rim.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination, a first clamping member, a second clamping member, one of said members being movable angularly relative to the other member when said former member is in an unlocked position, means for preventing relative angular movement of said members when they are in a locked position including telescoping parts associated with said clamping members, means for enabling said members to be held in cooperation with each other, and a lock for locking said members in cooperation and against separation.

2. In combination in a tire lock, a pair of cooperable clamping members including means for engaging the rim of a tire, one of said members being movable angularly relative to the other member when said former member is in an unlocked position, said members including telescoping parts adapted when said members are in cooperation and in a locked position to prevent relative angular movement, means for drawing said members toward each other and for maintaining said telescoping parts in cooperation, and a lock for locking said drawing means against operation whereby said clamping members may be effectively locked to the rim of the tire.

3. In combination in a tire lock, a pair of cooperable clamping members including means adapted to engage the rim of a tire, means for preventing relative angular movement of said members including parts connected to said members adapted to be brought into telescopic relation when said members are drawn toward each other, means for drawing said members toward each other including a bolt extending through said members, one clamping member being rotatably mounted on the bolt and the other member being connected thereto, and a lock adapted to lock said bolt against operation when said members are in cooperative relation.

4. In combination in a tire lock, a pair of cooperable clamping members including means adapted to engage the rim of a tire, means for preventing relative angular movement of said members including parts connected to said members adapted to be brought into telescopic relation when said members are drawn toward each other, means for drawing said members toward each other including a bolt extending through said members, one clamping member being rotatably mounted on the bolt and the other member being connected thereto, said bolt having a slotted portion disposed in one of said clamping members, and a key operated lock including a plunger for engaging said slotted portion of the bolt to hold the bolt against movement.

5. In combination in a tire lock, a pair of cooperable clamping members, each of which includes a jaw portion for engaging the edge of a tire rim, means for drawing the members toward each other including a bolt upon which one clamping member is rotatably mounted and to which the other member is secured, said bolt having a slotted intermediate portion on one of said clamping members, and a lock including a plunger for engaging said slotted portion to lock said bolt against rotation whereby said clamping members may be locked against separation.

6. In combination in a tire lock, a first clamping member, a second clamping member, said members including means for engaging the rim of a tire, said clamping members being provided with telescoping parts capable of relative rotation when partially telescoped, means for enabling said clamping members to be held in cooperation with each other, and a lock for locking said clamping members in cooperation and against separation, one of said telescoping parts comprising a lug adapted to extend into a slot in the other telescoping part, to prevent relative rotation between said telescoping parts, when said parts have been telescoped beyond a certain degree.

7. In combination in a tire lock, a first clamping member, a second clamping member, said members including means for engaging the rim of a tire, said clamping members being provided with telescoping parts, a screw for holding said clamping members in cooperation with each other, and a lock carried by one of said clamping members adapted positively to engage said screw to hold said clamping members in cooperation and against separation, one of said telescoping parts comprising a lug adapted to extend into a slot in the other telescoping part to prevent relative rotation between said telescoping parts.

In testimony whereof I have hereunto subscribed my name at St. Louis, Missouri.

COLVIN L. JOHNSON.